(12) United States Patent
Kozar et al.

(10) Patent No.: US 11,008,114 B2
(45) Date of Patent: May 18, 2021

(54) EXPANDABLE ENERGY ABSORBING FLUID BLADDER SYSTEMS AND METHODS

(71) Applicant: The Boeing Company, Chicago, IL (US)

(72) Inventors: Michael Patrick Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 362 days.

(21) Appl. No.: 15/698,573

(22) Filed: Sep. 7, 2017

(65) Prior Publication Data

US 2019/0071187 A1  Mar. 7, 2019

(51) Int. Cl.

| | |
|---|---|
| *B60K 15/03* | (2006.01) |
| *B64D 37/06* | (2006.01) |
| *F16F 9/10* | (2006.01) |
| *B64C 3/34* | (2006.01) |
| *B64D 37/04* | (2006.01) |
| *F16F 7/10* | (2006.01) |
| *F16F 13/10* | (2006.01) |
| *B63B 17/00* | (2006.01) |
| *B61C 17/02* | (2006.01) |

(52) U.S. Cl.
CPC .............. *B64D 37/06* (2013.01); *B60K 15/03* (2013.01); *B64C 3/34* (2013.01); *B64D 37/04* (2013.01); *F16F 7/1034* (2013.01); *F16F 9/106* (2013.01); *F16F 13/107* (2013.01); *B60K 15/03177* (2013.01); *B60K 2015/03171* (2013.01); *B60K 2015/03381* (2013.01); *B60Y 2200/52* (2013.01); *B61C 17/02* (2013.01); *B63B 17/0036* (2013.01)

(58) Field of Classification Search
CPC ......... B64C 25/54; B64C 25/56; B64C 25/66; B64C 35/00; B64C 35/008; B64C 3/34; B60F 5/02; B60K 2015/03381; B60K 2015/03171; B60K 15/03177; B60K 15/03; B60Y 2200/52; B63B 17/0036; B64D 37/06; B64D 37/04; B65D 90/24; F16F 9/106
USPC .......................... 220/562, 1.6, 723, 571, 501
See application file for complete search history.

(56) References Cited

U.S. PATENT DOCUMENTS

| | | | | |
|---|---|---|---|---|
| 3,748,477 | A * | 7/1973 | Wulbrecht | B60R 21/237 |
| | | | | 280/743.2 |
| 4,214,721 | A * | 7/1980 | Burhans, Jr. | B64D 37/04 |
| | | | | 220/6 |
| 5,813,680 | A * | 9/1998 | Shaw | B62B 1/264 |
| | | | | 220/573 |
| 5,927,651 | A | 7/1999 | Geders et al. | |
| 6,360,729 | B1 | 3/2002 | Ellsworth | |
| 2002/0030136 | A1* | 3/2002 | Chiu | B64C 27/006 |
| | | | | 244/17.15 |

(Continued)

*Primary Examiner* — Stephen J Castellano
(74) *Attorney, Agent, or Firm* — Haynes and Boone LLP

(57) ABSTRACT

Various techniques are provided for an expandable energy absorbing fluid bladder. In one example, the fluid bladder includes a primary portion and a secondary portion. The secondary portion can be configured to expand or increase in volume when the fluid bladder is subjected to a pulse greater than a threshold pulse. Expansion of the secondary portion can allow fluid or additional fluid to flow into the secondary (Continued)

portion and thus decrease a peak pulse and, thus, avoid rupture of the fluid bladder.

20 Claims, 16 Drawing Sheets

(56) References Cited

U.S. PATENT DOCUMENTS

2004/0008908 A1* 1/2004 Shepard ................ B65D 33/24
383/89

* cited by examiner

EXPANDABLE ENERGY ABSORBING FLUID BLADDER SYSTEMS AND METHODS

TECHNICAL FIELD

The disclosure relates generally to vehicle systems and more specifically to rupture resistant flexible vehicle fuel bladders having a structure that is configured to unfurl, expand, and/or otherwise absorb energy to prevent rupture of the fuel bladder.

BACKGROUND

Existing vehicle fuel bladders, when subjected to a force, can cause fuel contained within a fuel bladder to exert a pulse on a sidewall of the fuel bladder that can lead to rupture of the fuel bladder. Therefore, improved techniques are needed for fuel bladders.

SUMMARY

Systems and methods are disclosed for an expandable energy absorbing fluid bladder. A certain example discloses a fluid bladder including a flexible bladder body that includes a primary portion with a first bladder volume configured to contain fluid and a secondary portion with a secondary volume configured to receive at least a portion of the fluid from the primary portion when at least a portion of the bladder body receives a pulse from the fluid greater than a predetermined threshold pulse.

Another example discloses a method including receiving, by a flexible bladder body of a fluid bladder, a pulse greater than a predetermined threshold pulse from fluid contained within a primary portion of the flexible bladder body, and flowing, responsive to the receiving the pulse greater than a predetermined threshold pulse, at least a portion of the fluid into a secondary portion of the bladder body.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various embodiments of an expandable energy absorbing fuel bladder are disclosed herein along with related methods. As an illustrative example, a fuel bladder includes a flexible bladder body having a primary portion configured to normally contain fluid and a secondary portion configured to receive at least a portion of the fluid from the primary portion when a portion of the bladder body receives a certain force over time or distance herein referred to as a pulse. Pulse duration, peak force, and rate of force application (e.g. pulse shape) may be mitigated through various features of the bladder body described herein. For the purposes of this disclosure, "pulse" and/or "force" can refer to a force, a pulse (force over time), an acceleration, a jerk (acceleration over time), and/or other such force, momentum, and/or acceleration related physical forces. In certain examples, the fuel bladder can be configured to expand (e.g., increase in volume) after receiving the pulse. Expansion of the fuel bladder can dissipate the pulse by, for example, reducing the peak force received by the sidewall of the fuel bladder by increasing event duration and/or reducing the peak pulse received by the sidewall of the fuel bladder.

Figure 1:
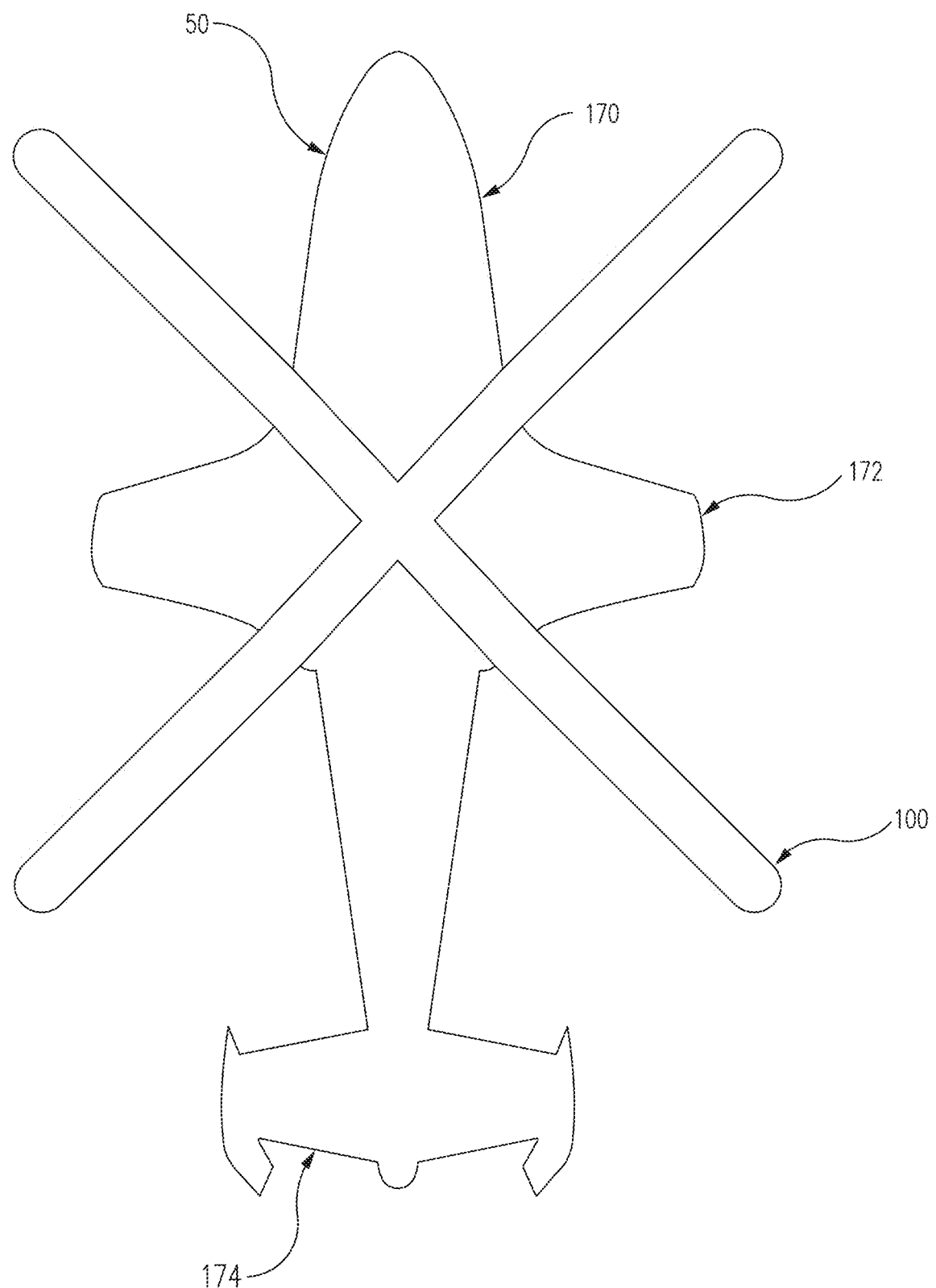
FIG. 1 illustrates an aircraft in accordance with an embodiment of the disclosure.

FIG. 1 illustrates an aircraft in accordance with an embodiment of the disclosure. The aircraft 50 of FIG. 1 includes a fuselage 170, wings 172, tail 174, and propulsion system 100. Though aircraft 50 shown in FIG. 1 is that of a vertical take-off and landing (VTOL) aircraft, other example aircrafts that can utilize the expandable energy absorbing fuel bladder disclosed herein can include short take-off and landing (STOL) or short take-off and vertical landing (STOVL) aircraft, fixed wing aircraft, remotely piloted aircraft, other types of aircraft, watercraft, automobiles, locomotives, spacecraft, and/or other forms of transport. As such, though the propulsion system 100 shown in FIG. 1 is a VTOL propeller, other examples can include propulsion systems that include other thrust producing systems such as turbofans, turboprops, ramjets, and other such systems, as well as internal combustion engines, electric drivetrains, and/or other such propulsion systems. The fuel bladder described in this disclosure is, thus, applicable to any type of vehicle and propulsion system.

The aircraft 50 can contain the expandable energy absorbing fuel bladder inside and/or outside the aircraft 50. For example, the expandable energy absorbing fuel bladder can be contained within the fuselage 170, wings 172, and/or tail 714 (e.g., disposed internally within the vehicle structure of the aircraft 50) and/or outside the fuselage 170, wings 172, and/or tail 714 on, for example, external fuel tanks coupled to the fuselage 170 and/or the wings 172. In certain examples using external fuel tanks, the expandable energy absorbing fuel bladder can be located within a hard outer tank.

The aircraft 50 described in FIG. 1 is exemplary and it is appreciated that in other embodiments, the aircraft 50 may include less or additional components (e.g., no horizontal stabilizer, additional stabilizers, additional sensors, and/or additional controllers). Also, concepts described herein may extend to other aircraft such as helicopters, fixed wing aircraft, Unmanned Aerial Vehicles, etc. and/or other vehicles (e.g., automobiles, watercraft, and/or trains).

Figure 2A:
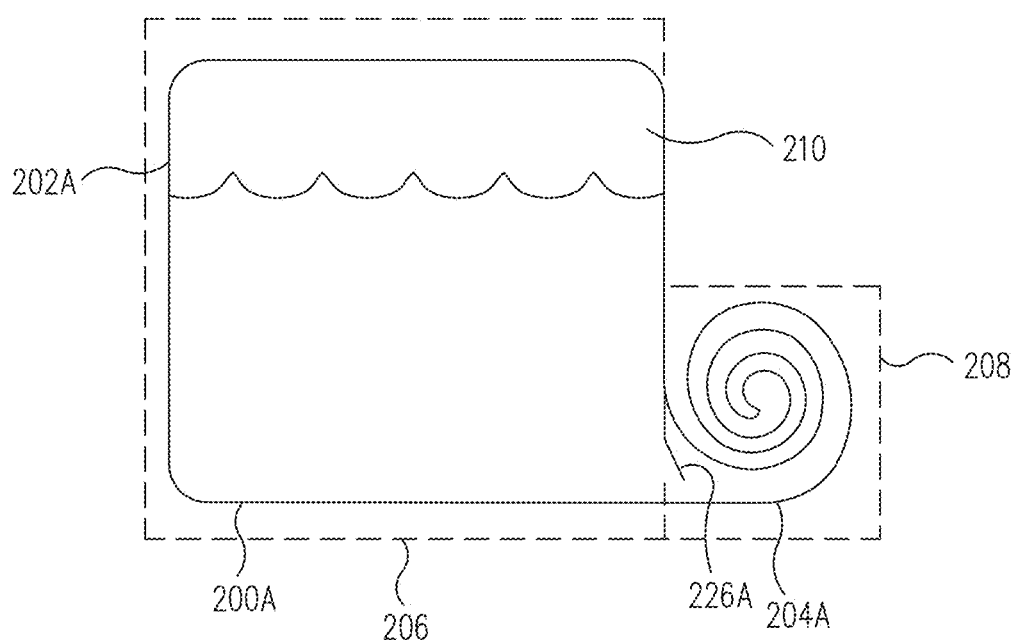
FIGS. 2A and 2B illustrate fluid bladders with furled secondary portions in accordance with an embodiment of the disclosure.
Figure 2B:
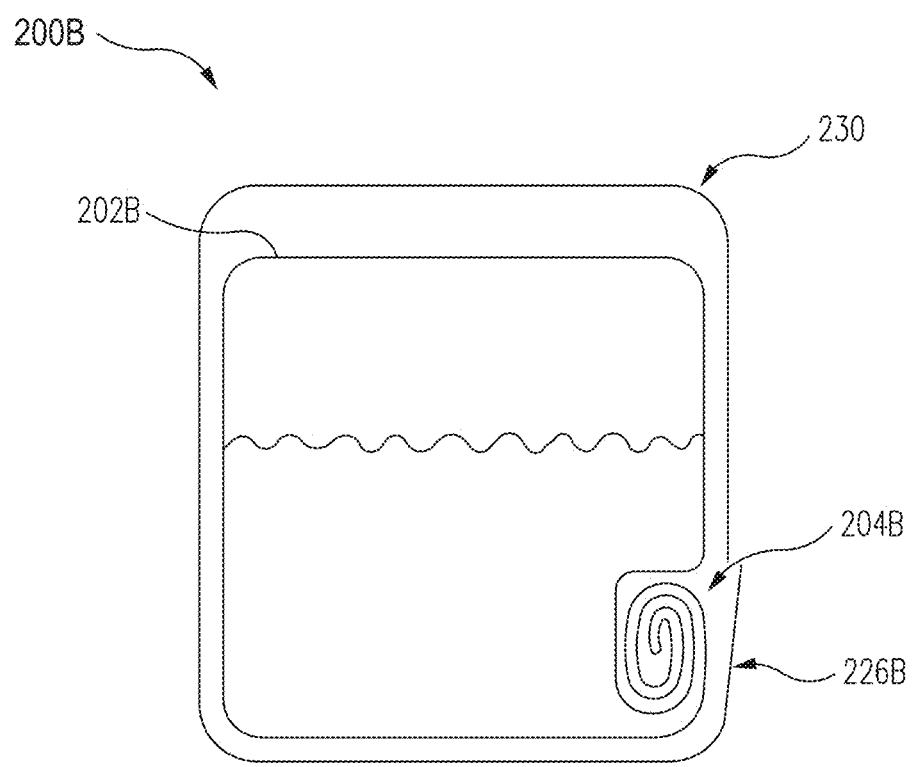

FIGS. 2A and 2B illustrate fluid bladders with furled secondary portions in accordance with an embodiment of the disclosure. FIG. 2A illustrates a flexible bladder body 200A with a primary portion 202A and a secondary portion 204A. The fluid bladder shown in FIG. 2A can be a fuel bladder configured to hold fuel within one or more fuel receptacles. For example, the primary portion 202A can be one such fuel receptacle.

The primary portion 202A can be a first bladder volume 206. The first bladder volume 206 of the primary portion 202A is configured to contain a fluid, such as fuel 210. During normal operation (e.g., of the aircraft 50), all fuel 210 contained within the flexible bladder body 200A is contained within the first bladder volume 206. The primary portion 202A can be flexible. As such, the primary portion 202A can vary in shape according to forces received, the volume of fuel 210 within the primary portion 202A, packaging requirements, the movement of fuel 210 within the primary portion 202A, and/or other such factors.

The secondary portion 204A can be a second bladder volume 208 and such a volume can be configured to expand when the flexible bladder body 200A receives a pulse greater than a predetermined pulse (e.g., from fuel 210 moving within the flexible bladder body 200A and/or from an source external to the flexible bladder body 200A). As such, the secondary portion 204A of the flexible bladder body 200A in FIG. 2A can be furled during normal operation. However, when the flexible bladder body 200A is subjected to a pulse greater than a threshold pulse, the secondary portion 204A can unfurl and at least a portion of the fuel 210 can flow into the unfurled secondary portion 204A. In certain examples, unfurling the secondary portion 204A can also expand the cross-sectional area of the secondary portion 204A and, thus, further increase the volume of the secondary portion 204A. Unfurling the secondary portion 204A and flowing a portion of the fuel 210 into the secondary portion 204A can dissipate energy from the pulse and, thus, prevent rupture of the flexible bladder body 200A. The secondary portion 204A can be located on any part of the bladder body 200A. For example, the secondary portion 204A can be located on an upper, middle, or lower portion of the bladder body 200A. In certain examples, the secondary portion 204A can be remote from the primary portion 202A and be fluidically connected to the primary portion 202A.

In certain examples, during normal operation, the flexible bladder body 200A can contain the fuel 210 and both the flexible bladder body 200A and the fuel 210 could be moving at a certain velocity, with the secondary portion 204A furled. The flexible bladder body 200A can then be subjected to motion above a threshold (e.g., from being sped up, slowed down, from changing directions, and/or from being suddenly lifted and/or dropped). Though the flexible bladder body 200A can respond quickly to the sudden acceleration, the momentum of the fuel 210 within the flexible bladder body 200A can continue to have momentum/inertia. The momentum/inertia of fuel 210 can thus exert a pulse on the flexible bladder body 200A.

In response to at least a portion of the flexible bladder body 200A receiving the pulse, the flexible bladder body 200A can unfurl the secondary portion 204A and/or increase the volume of the secondary portion 204A. Unfurling and/or increasing the volume of the secondary portion 204A can dissipate energy from the pulse and, accordingly, reduce a peak pulse imparted to the sidewalls of the flexible bladder body 200A (e.g., by spreading the pulse over a larger surface area). A high peak pulse can lead to rupture of the flexible bladder body 200A. Reduction of the peak pulse, by deploying the secondary portion 204A, can prevent rupture of the flexible bladder body 200A.

Certain examples of the secondary portion 204A of the flexible bladder body 200A are configured so that the secondary portion 204A does not deploy unless the pulse received is greater than a threshold pulse. Below the threshold pulse, the flexible bladder body 200A operates normally. If a pulse above the threshold pulse is received, the secondary portion 204A can deploy to lower and/or mitigate the pulse. For example, the pulse can cause the secondary portion 204A to unfurl, increase in volume, and/or allow the fuel 210 to flow into the secondary portion 204A.

In certain examples, the threshold pulse can be configured so that, below the threshold pulse, the likelihood of rupture of the flexible bladder body 200A by the pulse is minimal. Above the threshold pulse, the flexible bladder body 200A might be ruptured. In certain examples, the threshold pulse of the flexible bladder body 200A can be a threshold with a safety factor built in. As such, the risk of rupture when the flexible bladder body 200A is subjected to a pulse slightly above the threshold pulse can still be minimal, but when the flexible bladder body 200A is subjected to a pulse significantly above the threshold pulse (e.g., more than twice or higher than the threshold), the risk of rupture can increase.

The primary portion 202A and/or the secondary portion 204A can include one or more structures such as a hatch, door, break-away structure, locally weak area, and/or other such structures that allow for fuel to enter the secondary portion 204A to unfurl the secondary portion 204A when a pulse above the threshold pulse is received. FIG. 2A includes door 226A, an example of such a structure. Other examples can include other structures such as flow restricting structures that can prevent and/or restrict the amount of fuel that can enter the secondary portion 204A unless a pulse above the threshold pulse is received.

Certain examples of the secondary portion 204A can be configured to expand by receiving the fuel 210 into the secondary portion 204A. Thus, when fuel 210 flows into the secondary portion 204A, the fuel 210 imparts a pulse on the sidewalls of the secondary portion 204A and the secondary portion 204A then expands and increases in volume. Other examples of the secondary portion 204A can include one or more other mechanisms that can detect and/or respond to the pulse greater than the threshold pulse and deploy the secondary portion 204A (e.g., allow the volume of the secondary portion 204A to increase) accordingly. Such mechanisms can include, for example, springs, detents, sensors, actuators, and/or other mechanical, electrical, and/or electromechanical components that can detect and/or respond to the pulse and deploy the secondary portion 204A.

Additionally, certain examples of the secondary portion 204A can receive a portion of the fuel 210 before the secondary portion 204A is deployed by increasing in volume. Thus, deployment of the secondary portion 204A can increase the volume of fuel 210 that is contained within the secondary portion 204A. Other examples of the secondary portion 204A can be configured to not contain any fuel 210 during normal operation. The secondary portion 204A can be configured to not contain any fuel due to barriers between the primary portion 202A and the secondary portion 204A (that can be configured to fail and thus allow the fuel 210 to flow into the secondary portion 204A when a pulse greater than the threshold pulse is received) and/or due to the physical location of the secondary portion 204A (e.g., located at the top of the flexible bladder body 200A as shown in FIG. 2A so that the level of fuel 210 within the flexible bladder body 200A normally does not reach such heights).

Figure 3A:
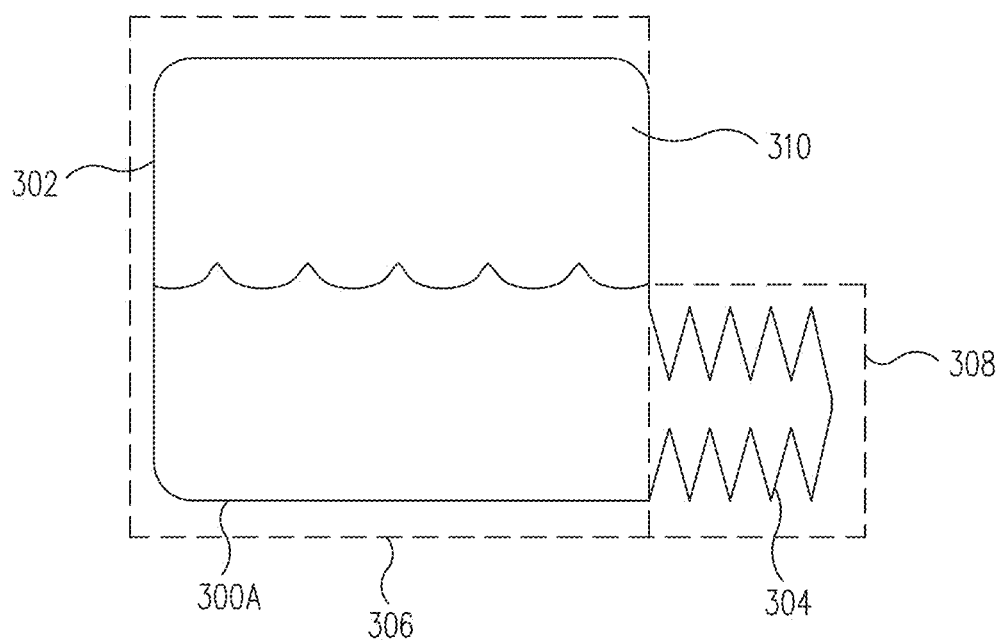
FIGS. 3A-C illustrate additional fluid bladders with accordion shaped secondary portions in accordance with an embodiment of the disclosure.
Figure 3B:
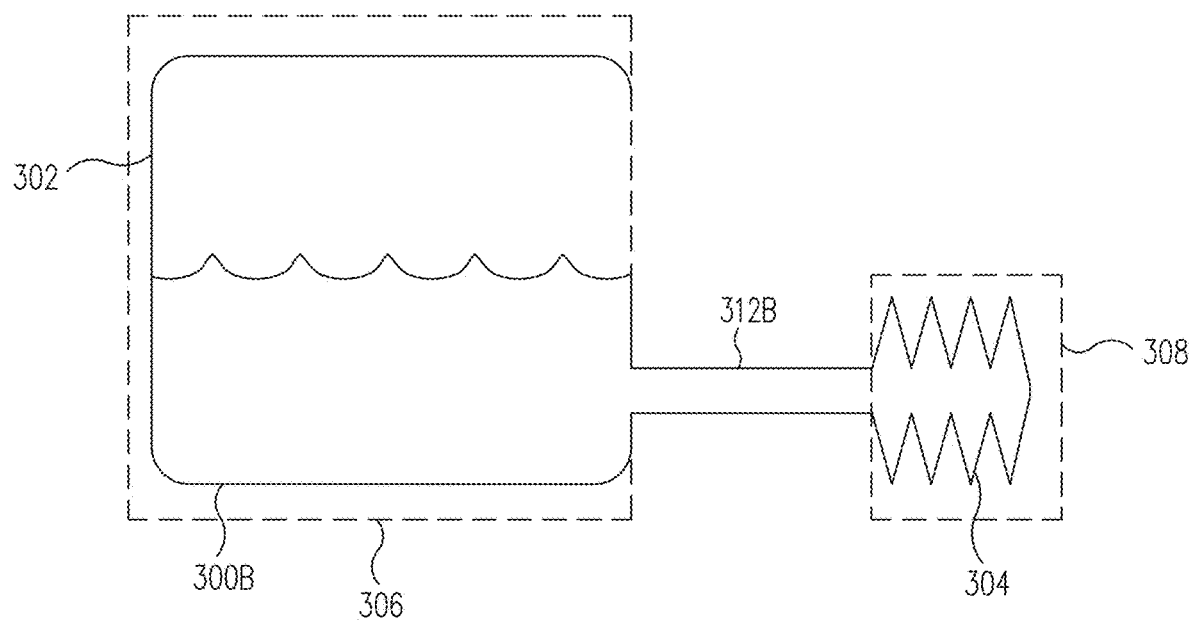
Figure 3C:
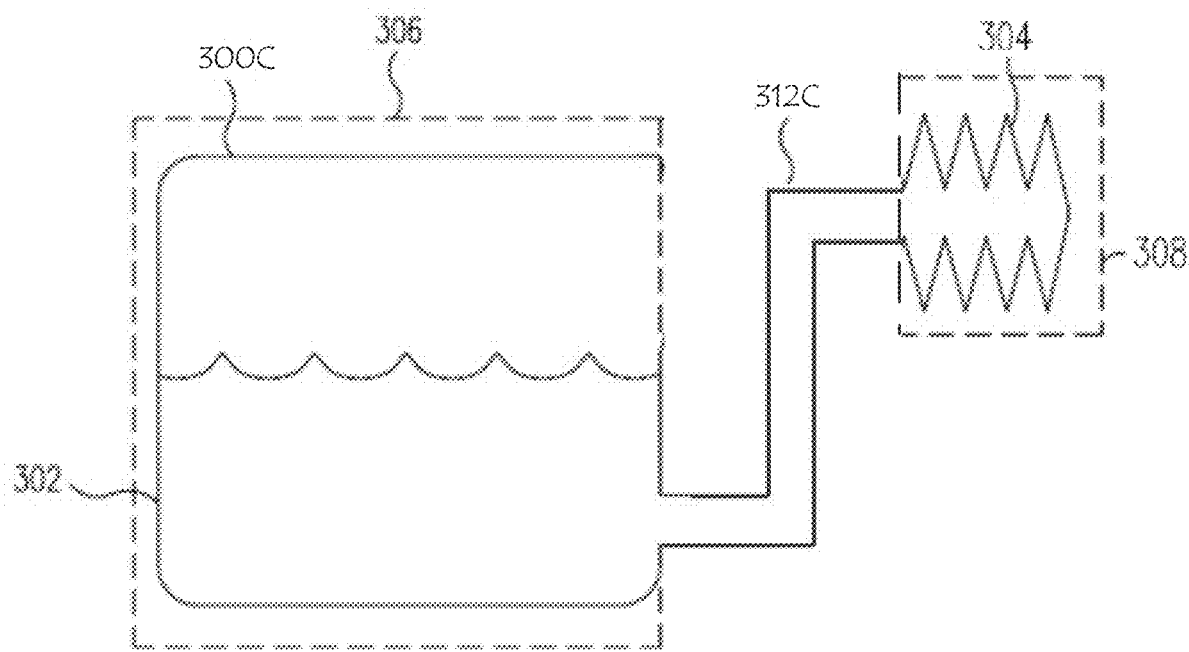

FIG. 2B illustrates a flexible bladder body 200B with a primary portion 202B and a secondary portion 204B. The primary portion 202B and the secondary portion 204B are disposed within a bladder housing 230. The bladder housing 230 can be, for example, a compartment on a vehicle configured to house the primary portion 202B, the secondary portion 204B, or both. The bladder housing 230 can include a door 226B. During normal operation, the door 226B can be closed, but the door 226B can be opened upon deployment (e.g., unfurling) of the secondary portion 204B. For example, deployment of the secondary portion 204B can cause an expansion in volume of the secondary portion 204B. The expansion in volume can push the secondary portion 204B against the door 226B, opening the door 226B FIGS. 3A-C illustrate additional fluid bladders with accordion shaped secondary portions in accordance with an embodiment of the disclosure. The flexible bladder body 300A shown in FIG. 3A includes a primary portion 302 similar to the primary portion 202 of FIG. 2A that is a first bladder volume 306 and a secondary portion 304 that is a second bladder volume 308.

The secondary portion 304 is bellows shaped. Bellows shaped secondary portion 304 is configured to expand when a pulse above the threshold pulse is received. Bellows shaped secondary portion 304 can expand by, for example, the secondary portion 304 allowing fuel 310 to flow into the secondary portion 304. The presence of fuel 310 allows the bellows shaped portion to expand and thus increase in volume.

FIGS. 3B and 3C illustrate flexible bladder bodies 300B and 300C, respectively, which are examples of the flexible bladder body 300A. As shown in FIGS. 3B and 3C, the secondary portion 304 is located remote from the primary portion 302 and is fluidically connected to the primary portion 302 via interconnects 312B and 312C. As shown in FIGS. 3B and 3C, the interconnects 312B and 312C, respectively, can allow fuel 310 to flow into the secondary portion 304 when the flexible bladder bodies 300B and 300C are subject to a pulse greater than a threshold pulse.

In certain examples, the secondary portion can be configured to receive a portion of the fuel during normal operation. When the flexible bladder body then receives a pulse greater than the threshold, the secondary portion can then deploy and/or expand to receive additional fuel to decrease the pulse.

Additionally, other examples can include secondary portions in other configurations. For example, a certain example can include a folded secondary portion. During normal operation, the secondary portion is thus folded against the primary portion. Such a secondary portion can expand when a pulse above the threshold pulse is received. Other examples can include secondary portions constructed from, for example, elastic materials. Such elastic materials can expand when deploying the secondary portion and, thus, allow fuel or additional fuel to flow into the secondary portion.

Figure 4:
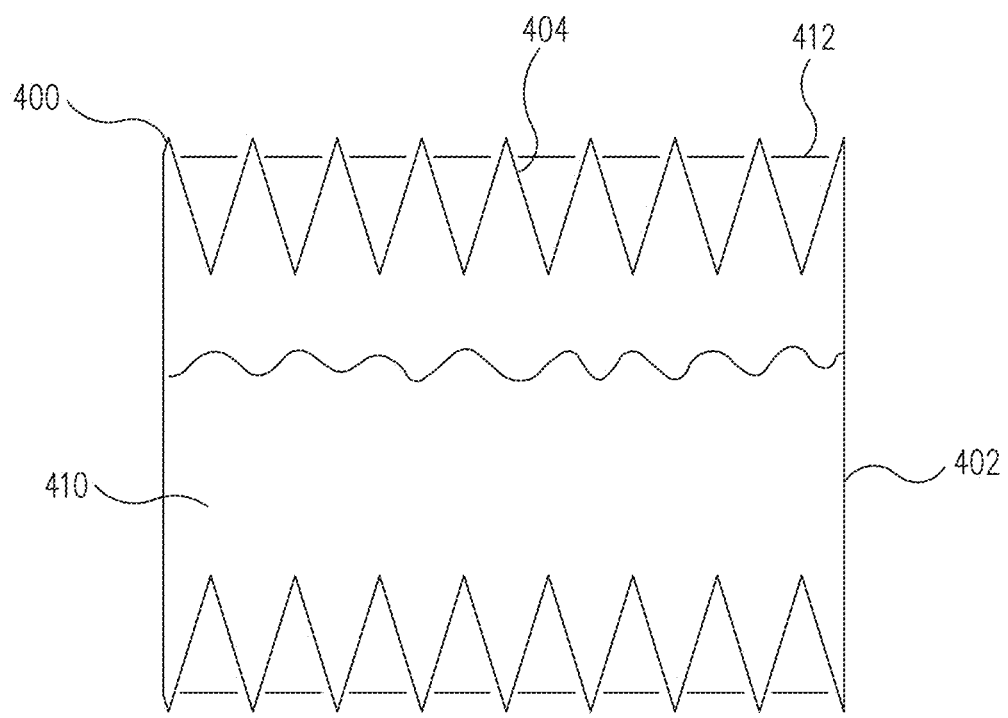
FIG. 4 illustrates a further example fluid bladder in accordance with an embodiment of the disclosure.

FIG. 4 illustrates a further example fluid bladder in accordance with an embodiment of the disclosure. The flexible bladder body 400 shown in FIG. 4 includes a bladder portion 402. In contrast to the examples shown in FIGS. 2 and 3, the flexible bladder body 400 does not include a secondary portion. Instead, bladder portion 402 includes accordion shaped sidewalls 404. In certain examples, the accordion shaped sidewalls 404 can be kept in a compressed configuration through the use of one or more mechanisms. Such mechanisms can include, for example, elastic 412, as well as elastically deforming, plastically deforming, or rupturing tension members, adhesives, hook and loop fasteners, dampers, components configured to plastically deform, and/or other such mechanisms that can deform in response to the flexible bladder body 400 receiving a pulse greater than a threshold pulse, as well as any combination thereof.

The one or more mechanisms can be configured to receive at least a portion of the pulse and, if above the threshold pulse, can be configured to deform and/or fail. Thus, the one or more mechanisms, such as elastic 412, can be configured to absorb at least a portion of the pulse and, if the pulse is above the threshold, can be configured to fail to allow an increase in volume within the flexible bladder body 400 to further decrease the peak pulse.

Figure 5A:
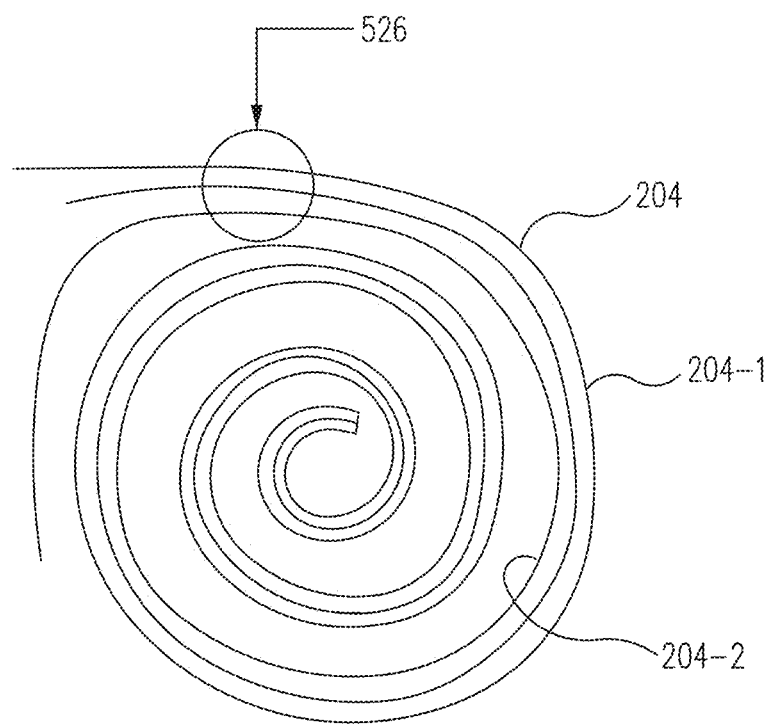
FIGS. 5A-D illustrate furl-able fluid bladders in accordance with an embodiment of the disclosure.

FIGS. 5A-D illustrate furlable fluid bladders in accordance with an embodiment of the disclosure. FIG. 5A shows the secondary portion 204 of FIGS. 2A and 2B in further detail. As shown in FIG. 5A, the secondary portion 204 is in a furled position and includes a first side 204-1 and a second side 204-2. In certain examples, at least a portion of the first side 204-1 is configured to couple to a portion of the second side 204-2. Various techniques can be used to couple the first side 204-1 to the second side 204-2. For example, elastically deforming, plastically deforming, or rupturing tension members, adhesives, coils, rolls, fabric hook and loop fasteners (e.g., Velcro®), magnets, hooks, and other such mechanisms that can couple the first side 204-1 to the second side 204-2 and/or couple interior portions of the secondary portion 204 together.

Figure 5B:
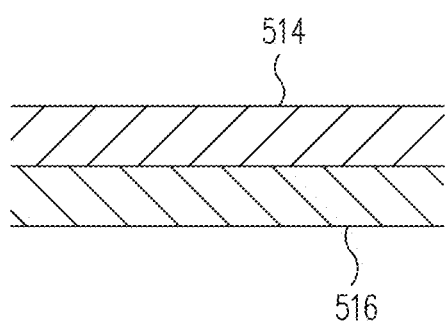
Figure 5C:
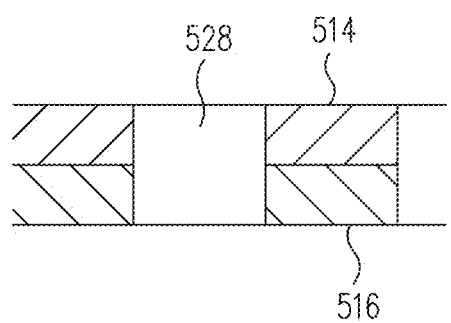
Figure 5D:
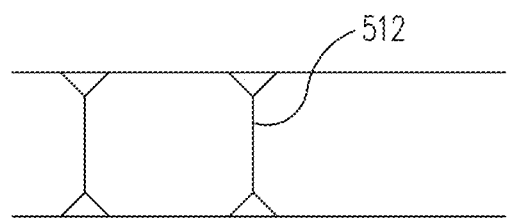

FIGS. 5B-D illustrate area 526 of FIG. 5A. Area 526 can further illustrate various examples of such mechanisms. Such mechanisms can be configured to unfurl to absorb energy and/or control flow within the secondary portion. FIG. 5B illustrates a continuous hook and loop fastener. As shown, hook 514 and loop 516 can couple with each other and can be decoupled when subjected to a pulse greater than a threshold pulse. FIG. 5C illustrates a variation of the hook and loop fastener that includes patches of hook and loop fasteners. Accordingly, space 528 can be disposed between patches of hook 514 and loop 516. Such spaces can allow for fluid or fuel to flow into the spaces when an adjacent patch of the hook and loop fasteners are decoupled. As such, pulses can be progressively dissipated when opening various hook and loop fasteners. Additionally, patches of hook and loop fasteners as shown in FIG. 5C can allow for expansion of the secondary portion at a lower threshold pulse than the example shown in FIG. 5B.

FIG. 5D can include tension members 512 that can be breakable or stretchable when subjected to a certain pulse. Such tension members can hold the secondary portion at a certain volume when unbroken or stretched. Upon breakage or stretching of the tension members 512, the secondary portion can then expand to a greater volume. In certain other examples, flow restrictors or other devices can also be used to control the flow of fuel and absorption of energy (e.g., pulse). One or more of the examples FIGS. 5B-D and other examples can be used individually or combined with one or more other mechanisms.

When the flexible bladder body receives a pulse greater than the threshold pulse, the first side 204-1 can decouple from the second side 204-2 and, thus, the secondary portion 204 can unfurl. After the first side 204-1 decouples from the second side 204-2 and the secondary portion 204 unfurls, the secondary portion 204 can expand in volume and, accordingly, receive additional fuel from the primary portion.

Figure 6:
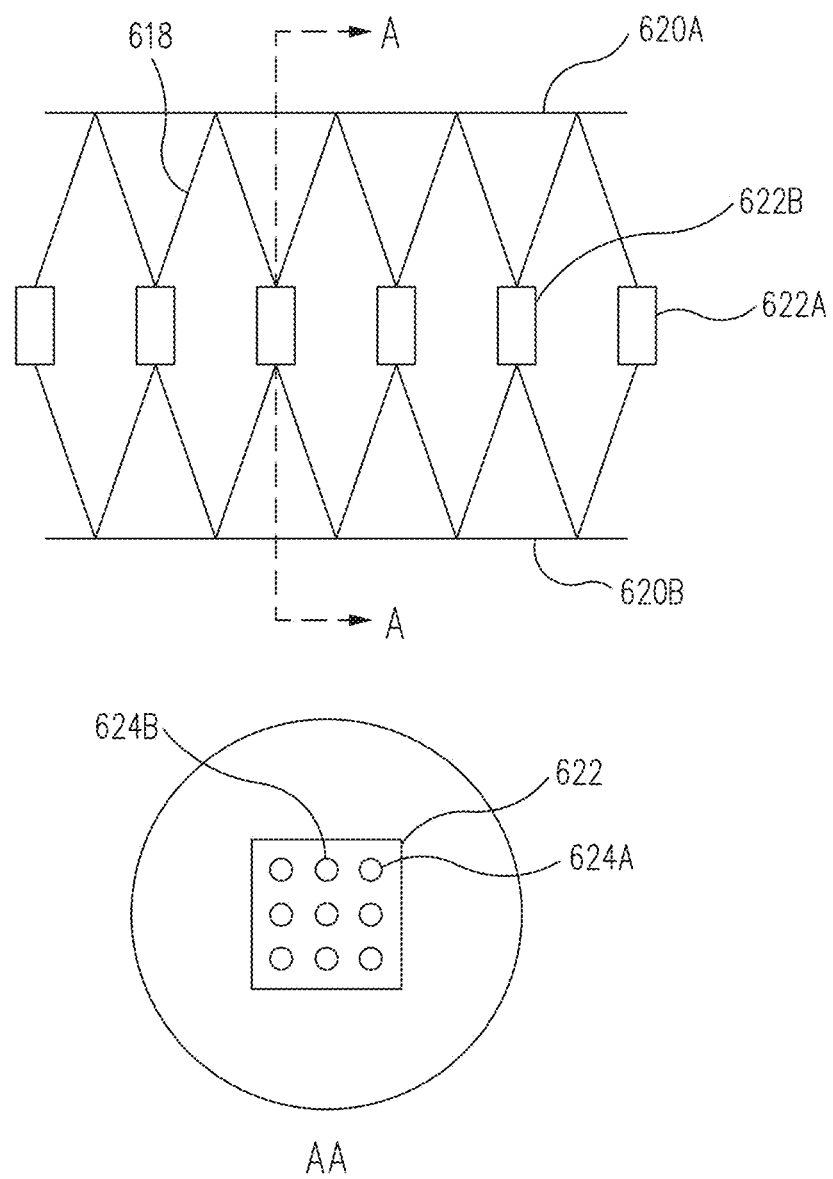
FIG. 6 illustrates energy absorbing features of a fluid bladder in accordance with an embodiment of the disclosure.

FIG. 6 illustrates energy absorbing features of a fluid bladder in accordance with an embodiment of the disclosure. Energy absorbing structure 618 can be disposed within a portion of the primary portion and/or the secondary portion of a flexible bladder body. The energy absorbing structure 618 can include the energy absorbing portions 620A-B. In certain examples, the energy absorbing structure 618 can be a flexible bladder body of a fuel bladder or a portion thereof. The energy absorbing portions 620A-B can be configured to, for example, hold the secondary portion in a closed (e.g., furled) position. However, responsive to receiving the pulse greater than the threshold pulse, the energy absorbing portions 620A-B can fail and, thus, allow fuel to flow into the secondary portion and/or allow the secondary portion to expand to an opened position (e.g., unfurl).

The energy absorbing structure 618 shown in FIG. 6 also includes flow restricting portions 622A-B. Cross-sectional view AA shows a cross section of a flow restricting portion 622. The flow restricting portion 622 can be a perforated structure that includes perforations 624A-B. As such, the flow restricting portion 622 is configured to restrict flow of fuel so that, when fuel flows through the perforations 624A-B, the flowing fuel imparts a force on the flow restricting portion 622 and the flow restricting portion 622 in turn imparts a force on the energy absorbing portions 620A-B. Certain other examples of the flow restricting portion 622 can include more or fewer perforations, perforations in other shapes, other types of openings, and/or no openings or perforations at all.

The energy absorbing portions 620A-B can receive the force from the flow restricting portion 622. If the force is above a threshold failure force, one or more of the energy absorbing portion 620A-B can deform and/or fail. Deformation and/or failure of the energy absorbing portion 620A-B can allow more fuel to flow into the secondary portion and/or increase the volume of the secondary portion as well as, in certain examples, the primary portion. In certain examples, the energy absorbing portions 620A-B can be one or more elastically deforming, plastically deforming, or rupturing tension members, adhesives, hook and loop fasteners, composites, fabrics, metallic elements, and/or other components that are configured to deform and/or fail responsive to the force above the threshold failure force. Certain examples can include the energy absorbing structure 618 as a component to reduce the volume of the secondary portion 204 in normal operation, and certain such examples can include the energy absorbing structure 618 in addition to other structures described herein, such as a furled and billow shaped secondary portion 204.

Figure 7A:
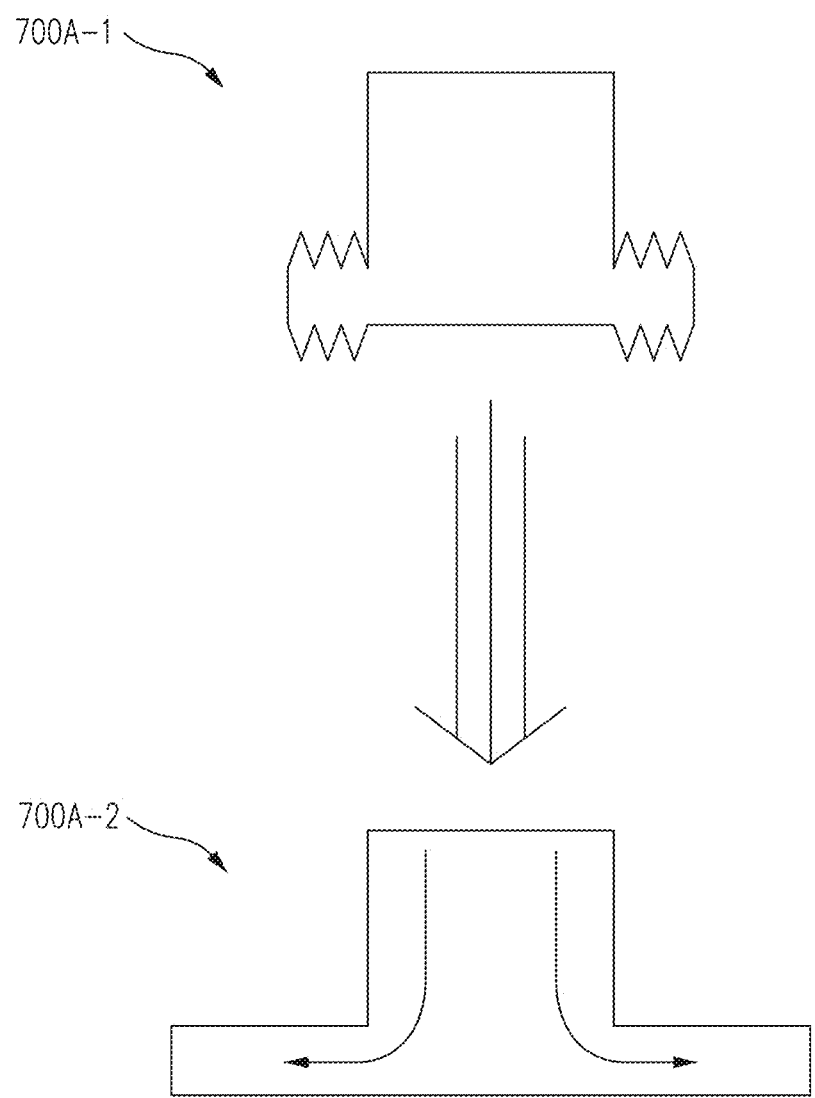
FIGS. 7A-C illustrate a sequence of operation of various fluid bladders in accordance with embodiments of the disclosure.
Figure 7B:
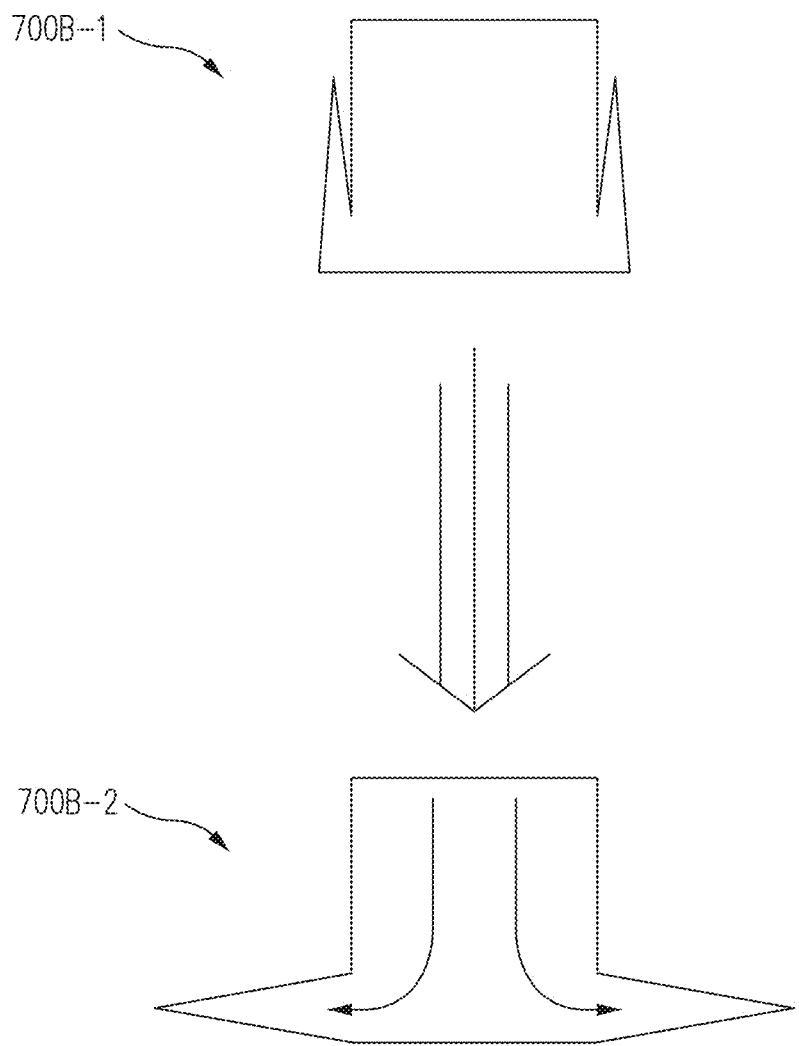
Figure 7C:
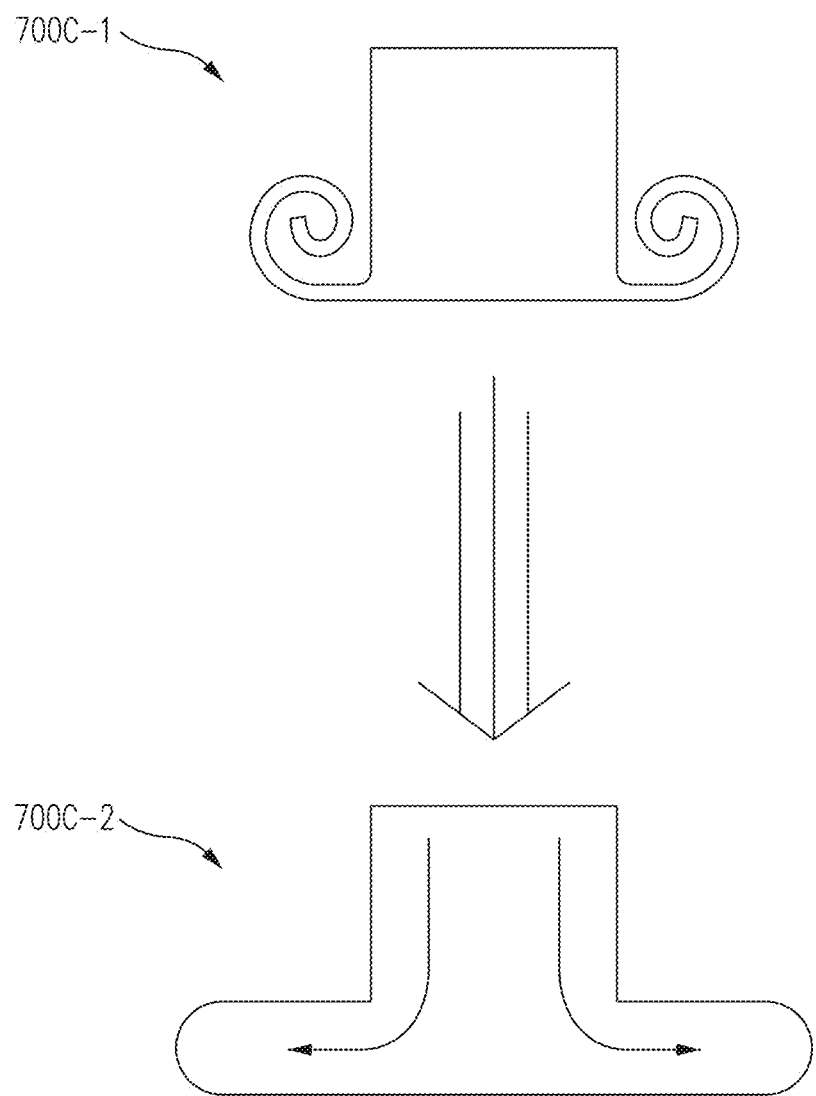

FIGS. 7A-C illustrate a sequence of operation of various fluid bladders in accordance with embodiments of the disclosure. FIG. 7A illustrates a sequence of operation of a fluid bladder with a plurality of billow shaped secondary portions. Sequence 700A-1 shows the fluid bladder during normal operation. In sequence 700A-2, an outside force is received that causes fuel contained within the fluid bladder to exert a pulse on the sidewall of the flexible bladder body of the fluid bladder. The secondary portion then expands in volume and fuel or additional fuel flows into the secondary portion. The expansion of the secondary portion and/or flowing of fuel or additional fuel into the secondary portion allows dissipation (e.g., decrease) of the pulse and, thus, avoids rupture of the flexible bladder body.

FIG. 7B illustrates a sequence of operation of a fluid bladder with a plurality of folded secondary portions. Sequence 700B-1 shows the fluid bladder during normal operation. In 700B-1, the folded secondary portions are folded against the sidewalls of the primary portion. In sequence 700B-2, an outside force is received and, thus, the secondary portion then unfolds and expands in volume and fuel or additional fuel flows into the secondary portion. As shown in FIG. 7B, the folded secondary portions are deployed by detaching from the primary portion and increasing in volume.

FIG. 7C illustrates a sequence of operation of a fluid bladder with a plurality of furled secondary portions. Sequence 700C-1 shows the fluid bladder during normal operation as the secondary portions are furled. In sequence 700C-2, an outside force is received and, thus, the secondary portion unfurls and fuel or additional fuel flows into the secondary portion.

The energy absorbing structures (e.g., flexible fluid bladders and/or secondary portions) described in FIGS. 2A to 7C can be incorporated, be individually incorporated, or multiple structures described in FIGS. 2A to 7C can be incorporated into a single fluid bladder. As such, for example, a fluid bladder can incorporate both the secondary portion 204 and accordion shaped bladder portion 404.

Figure 8:
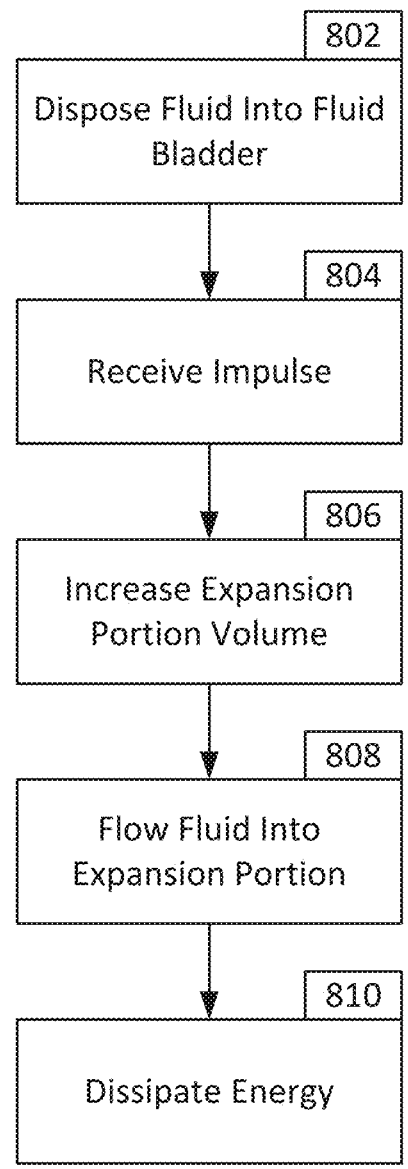
FIG. 8 is a flowchart detailing a method of operation of a fluid bladder in accordance with an embodiment of the disclosure.

FIG. 8 is a flowchart detailing a method of operation of a fluid bladder in accordance with an embodiment of the disclosure. In block 802, fluid is disposed within the fluid bladder. In certain examples, the fluid is disposed within the primary portion of the fluid bladder.

In block 804, a pulse is received. The pulse can, for example, accelerate or decelerate the fluid bladder. At least a portion of the fluid contained within the fluid bladder, due to inertia, can thus be moving at a velocity different from that of the fluid bladder and, accordingly, impart a pulse on the sidewall of the fluid bladder.

After receiving the pulse, the fluid bladder can allow expansion of a secondary portion of the fluid bladder in block 806. In block 808, the fluid can flow into the secondary portion and/or additional fluid can flow into the secondary portion due to the expansion in volume of the secondary portion.

As such, in block 810, the pulse can be reduced. Expansion of the secondary portion can lead to reduction of the pulse imparted on the sidewall of the fluid bladder. Flowing such fluid into the secondary portion can also reduce the pulse. Thus, rupture of the sidewall of the fluid bladder can be avoided.

Examples described above illustrate but do not limit the invention. It should also be understood that numerous modifications and variations are possible in accordance with the principles of the present invention. Accordingly, the scope of the invention is defined only by the following claims.

What is claimed is:

1. A fluid bladder comprising:
   a bladder body comprising:
      a primary portion with a first bladder volume that is closed and configured to contain fluid,
      a secondary portion with a secondary volume configured to receive at least a portion of the fluid from the primary portion when at least a portion of the bladder body receives a pulse from the fluid greater than a predetermined threshold pulse, and
      a structure configured to limit fluid flow from the primary portion into the secondary portion, wherein the structure allows the at least a portion of the fluid to flow into the secondary portion responsive to the bladder body receiving the pulse greater than the predetermined threshold pulse, and wherein the structure comprises a door between the primary portion and the secondary portion configured to open responsive to the bladder body receiving the pulse greater than the predetermined threshold pulse.

2. The fluid bladder of claim 1, wherein the secondary portion is configured to dissipate energy of the fluid flowing into the secondary portion to reduce a peak pulse of the fluid.

3. The fluid bladder of claim 1, wherein the secondary portion comprises a furled portion configured to at least partially unfurl responsive to the bladder body receiving the pulse greater than the predetermined threshold pulse.

4. The fluid bladder of claim 1, wherein the secondary volume is configured to increase responsive to the bladder body receiving the pulse greater than the predetermined threshold pulse.

5. The fluid bladder of claim 1, wherein the secondary portion comprises one or more energy absorbing structures configured to receive the pulse greater than the predetermined threshold pulse and deform to allow fluid to flow into at least a portion of the secondary portion.

6. The fluid bladder of claim 5, wherein the one or more energy absorbing structures comprise one or more elastically deforming, plastically deforming, or rupturing tension members.

7. A vehicle comprising the fluid bladder of claim 1, wherein the vehicle further comprises a vehicle structure and the fluid bladder is disposed internally within the vehicle structure and/or outside the vehicle structure.

8. The vehicle of claim 7, wherein the vehicle is an aircraft and the vehicle structure comprises:
 a fuselage; and
 a wing, wherein the fluid bladder is disposed within at least the fuselage, the wing, and/or an external fuel tank coupled to the fuselage or the wing.

9. A method of operating the fluid bladder of claim 1, the method comprising:
 receiving, by the bladder body, the pulse;
 limiting, by the structure, the fluid flow from the primary portion into the secondary portion; and
 flowing, responsive to the receiving, the at least a portion of the fluid into the secondary portion.

10. The method of claim 9, wherein the secondary portion is configured to dissipate energy of fluid flowing into the secondary portion to reduce a peak pulse of the fluid.

11. The method of claim 9, wherein receiving the pulse greater than the predetermined threshold pulse comprises:
 receiving, with a flow restricting portion of the bladder body, the pulse greater than the predetermined threshold pulse from the fluid; and
 allowing the portion of the fluid to flow into the secondary portion responsive to the pulse greater than the predetermined threshold pulse.

12. The method of claim 9, further comprising:
 increasing a volume of the secondary portion responsive to the bladder body receiving the pulse greater than the predetermined threshold pulse.

13. The method of claim 9, further comprising opening, by the fluid, the door between the primary portion and the secondary portion responsive to receiving the pulse greater than the predetermined threshold pulse.

14. The method of claim 9, wherein the flowing the fluid into the secondary portion comprises at least partially expanding the secondary portion.

15. The method of claim 9, further comprising:
 deforming one or more energy absorbing structures responsive to the receiving the pulse greater than the threshold pulse, wherein the flowing of the fluid into the secondary portion is responsive to the deforming the one or more energy absorbing structures.

16. The method of claim 9, wherein the fluid is fuel.

17. A fluid bladder comprising:
 a bladder body comprising:
 a primary portion with a first bladder volume that is closed and configured to contain fluid,
 a secondary portion with a secondary volume configured to receive at least a portion of the fluid from the primary portion when at least a portion of the bladder body receives a pulse from the fluid greater than a predetermined threshold pulse, and
 a structure configured to limit fluid flow from the primary portion into the secondary portion, wherein the structure allows the at least a portion of the fluid to flow into the secondary portion responsive to the bladder body receiving the pulse greater than the predetermined threshold pulse,
 wherein the secondary portion comprises a furled portion configured to at least partially unfurl responsive to the bladder body receiving the pulse greater than the predetermined threshold pulse,
 and wherein the structure comprises a hook and loop fastener configured to hold the furled portion in a furled position during a normal operation of a vehicle and configured to allow the furled portion to at least partially unfurl responsive to the bladder body receiving the pulse greater than the predetermined threshold pulse.

18. The fluid bladder of claim 17, wherein the secondary portion comprises one or more energy absorbing structures configured to receive the pulse greater than the predetermined threshold pulse and deform to allow fluid to flow into at least a portion of the secondary portion.

19. The fluid bladder of claim 18, wherein the one or more energy absorbing structures comprise one or more elastically deforming, plastically deforming, or rupturing tension members.

20. The fluid bladder of claim 17, wherein the secondary volume is configured to increase responsive to the bladder body receiving the pulse greater than the predetermined threshold pulse.

* * * * *